US007316158B2

(12) United States Patent
Boeck et al.

(10) Patent No.: US 7,316,158 B2
(45) Date of Patent: Jan. 8, 2008

(54) TEST STAND WITH TIPPING DEVICE FOR MOTOR VEHICLES

(75) Inventors: Hans Boeck, Erlenbach (DE); Thomas Kuebel, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/644,907

(22) Filed: Aug. 21, 2003

(65) Prior Publication Data

US 2004/0060350 A1 Apr. 1, 2004

Related U.S. Application Data

(63) Continuation of application No. PCT/DE02/00614, filed on Feb. 20, 2002.

(30) Foreign Application Priority Data

Feb. 21, 2001 (DE) .......................... 201 03 107 U

(51) Int. Cl.
*G01M 17/00* (2006.01)

(52) U.S. Cl. ....................... 73/121; 254/3 C; 254/89 R

(58) Field of Classification Search ................ 254/3 B, 254/3 C, 9 B, 9 C, 10 B, 10 C, 10 R, 2 B, 254/2 C, 423, 89 R, 90, 89 H, 93 L, 94, 254/DIG. 9; 73/11.04, 11.09, 669, 670, 112, 73/116, 117, 117.2, 121, 122, 123, 124
See application file for complete search history.

(56) References Cited

U.S. PATENT DOCUMENTS 1,525,447 A 2/1925 Hose
1,994,942 A * 3/1935 Calkins ....................... 73/669
2,274,619 A * 2/1942 Swan .......................... 73/669
2,471,901 A * 5/1949 Ross .......................... 254/9 C
2,929,519 A * 3/1960 Taylor ........................ 414/590
3,655,081 A 4/1972 Monk
3,827,289 A * 8/1974 Borg ........................... 73/669
3,906,779 A * 9/1975 Graham et al. ............ 73/11.07
4,263,809 A * 4/1981 Petersen et al. .............. 73/798
5,040,637 A 8/1991 Hawk
5,074,000 A * 12/1991 Soltani et al. ................. 5/611
5,213,458 A * 5/1993 Preller et al. ................. 410/26
5,344,266 A * 9/1994 Kolb ........................... 410/26
5,597,359 A 1/1997 Byerly
5,890,855 A * 4/1999 Claps .......................... 410/26
6,422,536 B1 * 7/2002 Kelley et al. ............. 254/89 R
2001/0052174 A1 * 12/2001 Granata ....................... 29/273
2003/0230137 A1 * 12/2003 Kemp et al. .................. 73/117
2004/0003655 A1 * 1/2004 Kemp et al. ............... 73/118.1

FOREIGN PATENT DOCUMENTS

| | | | |
|---|---|---|---|
| EP | 0 245 666 | A2 | 11/1987 |
| GB | 2 084 541 | A | 4/1982 |
| WO | WO 00/60330 | A1 | 10/2000 |

* cited by examiner

*Primary Examiner*—Eric S. McCall
(74) *Attorney, Agent, or Firm*—Sughrue Mion, PLLC

(57) ABSTRACT

A test stand for motor vehicles, having a tipping device. The tipping device has a lower frame unit (13) and an upper frame unit (6) that can be tipped relative to the lower frame unit. The tipping device is further provided with four lifting units (17) disposed in the corner zones (7, 8, 9, 10) of the frame units.

22 Claims, 2 Drawing Sheets

TEST STAND WITH TIPPING DEVICE FOR MOTOR VEHICLES

This is a Continuation of International Application PCT/DE02/00614, with an international filing date of Feb. 20, 2002, which was published under PCT Article 21(2) in German, and the disclosure of which is incorporated into this application by reference.

FIELD OF AND BACKGROUND OF THE INVENTION

The invention relates to a test stand with tipping device for motor vehicles. This tipping device is used to tip the motor vehicle being tested about its longitudinal and transverse axes in an ESP test procedure.

To tip a vehicle, it is already known from WO 00/60330 to raise the vehicle first into the appropriate testing position. Locking means provided between an upper and a lower part of a supporting frame are then selectively released or locked in such a way that by using a lifting unit disposed between the frame parts, the upper part of the frame on which the vehicle being tested is supported can be tipped in longitudinal or transverse direction relative to the lower part of the frame.

A disadvantage in such a method is that the times required to adjust the tipping device are relatively long because the locking means must be adjusted.

OBJECTS OF THE INVENTION

Based on this prior art, one object of the invention is to provide a motor vehicle test stand with a tipping device in which the time required to adjust the tipping device is reduced, so that a greater number of vehicles can be tested per unit of time.

SUMMARY OF THE INVENTION

This and further objects are solved, according to one formulation of the invention, by a motor vehicle test stand having a tipping device including a lower frame unit; an upper frame unit configured to tip relative to the lower frame unit; and four lifting units disposed in corner zones of the frame units. Refinements and advantageous embodiments are also embraced by the invention and are described and claimed herein below.

Advantages of the invention include, especially, the pronounced reduction in cycle times, which stems, in particular, from the substantially lower resetting times as compared to the prior art. In addition, a test stand with tipping device for motor vehicles according to the invention increases the process reliability and reduces the maintenance costs compared to vehicle test stands of the prior art.

BRIEF DESCRIPTION OF THE DRAWINGS

Further advantageous features of the invention will become clear from the following description with reference to an exemplary embodiment depicted in the drawing in which.

DETAILED DESCRIPTION OF THE PREFERRED EMBODIMENTS

Figure 1:
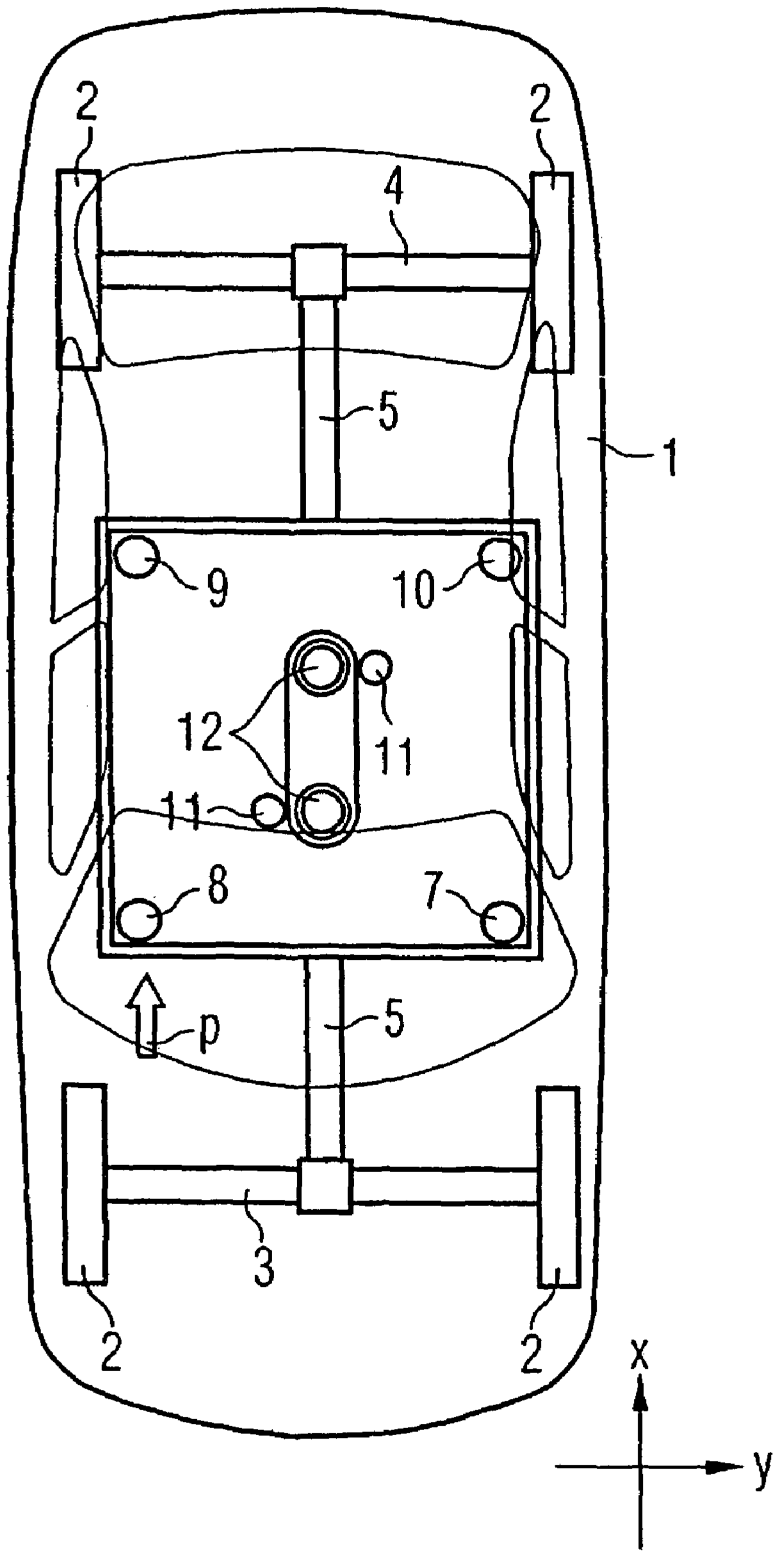
FIG. 1 is a schematic top view of a motor vehicle test stand carrying a motor vehicle to be tested.

FIG. 1 is a schematic top view of a motor vehicle test carrying a motor vehicle 1 to be tested.

The motor vehicle test stand includes an upper frame unit 6 (see also FIG. 2) to which are fixed support arms 5 extending in longitudinal vehicle direction. In their end zones, these support arms are connected with support arms 3, 4 that extend in transverse vehicle direction. Wheel location elements 2 are provided on the outer faces of the support arms 3, 4.

The upper frame unit 6 is embodied as a flat metal plate and has a square or rectangular area. The tipping device is provided with respective lifting units in each of the corner zones of the upper frame unit 6, as will be described in greater detail with reference to FIG. 2 and FIG. 3.

A motor vehicle test stand according to the invention, which is preferably an ESP (Electronic Stability Program) test stand, is provided with guides 12 and a lifting unit 11, which serve to raise the vehicle into the testing position.

The tipping device according to the invention can tip the vehicle in both longitudinal and transverse direction during the ESP test procedure.

Figure 2:
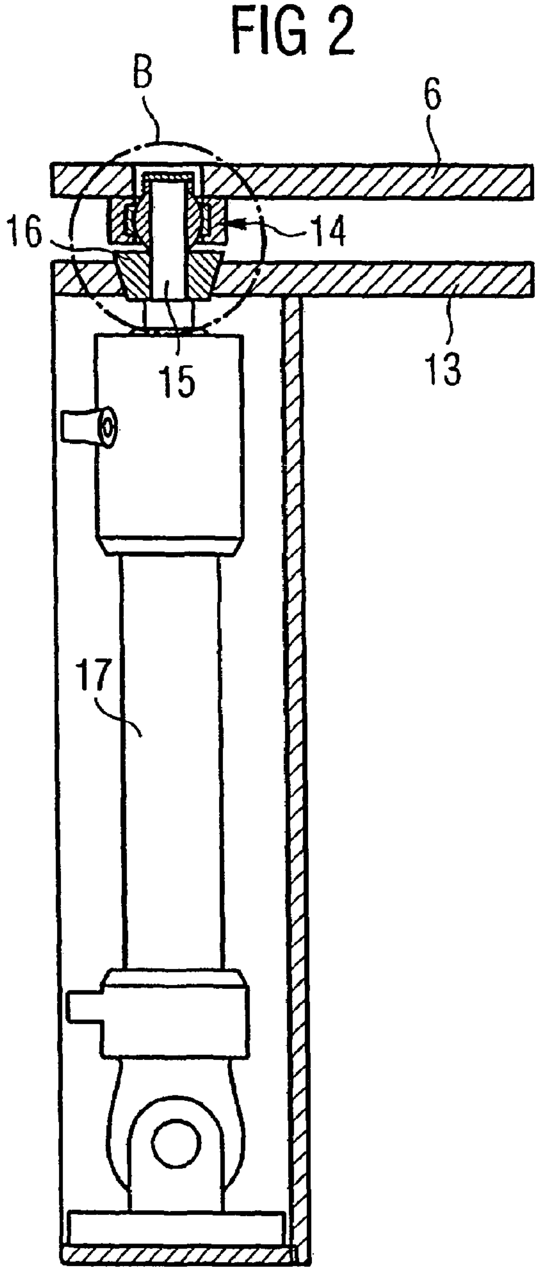
FIG. 2 shows a part of a motor vehicle test stand according to the invention, including primary features of the inventive motor vehicle test stand.

FIG. 2 shows a part of a motor vehicle test stand according to the invention, illustrating in particular the important features of the invention. The depicted part is a side view of the front right corner of the test stand as seen in the direction of arrow p in FIG. 1.

FIG. 2 shows that a lower frame unit 13 is provided underneath the upper frame unit 6. The lower frame unit 13 also has a square or rectangular area. The two frame units are arranged approximately congruently one above the other. Consequently, one of the lifting units is also provided in each of the four corner zones of the lower frame unit 13. The two frame units 6 and 13 are interconnected exclusively via these four lifting units.

The lifting unit 17 depicted in FIG. 2 is provided with a piston rod 15 on its topside. This piston rod is guided through a conical hole that widens toward the upper surface in the lower frame unit 13. The piston rod is connected with the upper frame unit 6 via a spherical bearing 14.

When the piston rod 15 is in the non-extended position, as shown in FIG. 2, a conical frame 16 of the piston rod 15 is inserted into the conical hole of the lower frame unit 13 in such a way that this hole is sealed. The conical frame 16 of the piston rod is preferably firmly connected with the piston rod, e.g., welded thereto. This ensures positive locking between the piston rod and the lower frame unit in x/y directions in the plane of the lower frame unit and forms a locating bearing between the lower and the upper frame unit.

When the lifting unit 17 extends the piston rod 15 from its retracted position, the piston rod 15 pushes the upper frame unit 6 in upward direction in the area of the right front corner 8 of the tipping device. Since the conical frame 16 is also moved upwardly as the piston rod 15 is extended, a lateral clearance is created in the conical hole of the lower frame unit 13. This permits the piston rod to deflect laterally to a slight degree as it is extended.

If the piston rod that is arranged in the right rear corner 9 of the tipping device is extended by the right rear lifting device at the same time that the piston rod 15 arranged in the right front corner 8 of the tipping device is extended, and the piston rods located in the corners 7 and 10 remain in their retracted positions, tipping of the vehicle occurs about its longitudinal axis.

In contrast, if the piston rod that is arranged in the left front corner 7 of the tipping device is extended by the respective lifting unit at the same time that the piston rod 15 arranged in the right front corner 8 of the tipping device is extended, and the piston rods located in the rear corners 9 and 10 remain in their retracted positions, tipping of the vehicle occurs about its transverse axis.

The lifting units that are arranged in the corners can be preferably operated in both push and pull direction to ensure a secure position in all operating states.

Figure 3:
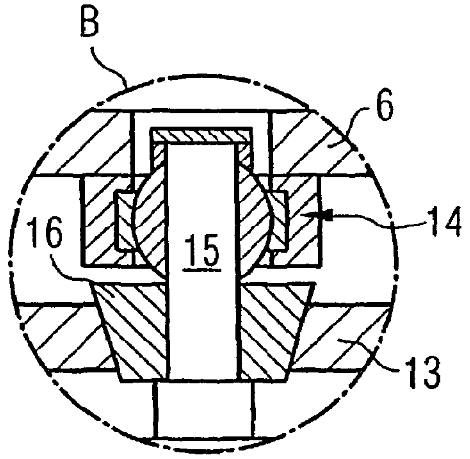
FIG. 3 is an enlargement of detail B of the motor vehicle test stand depicted in FIG. 2.

FIG. 3 shows an enlargement of detail B of the motor vehicle test stand depicted in FIG. 2. This enlarged representation illustrates, in particular, the connection of the piston rod 15 via a spherical bearing 14 with the upper frame unit 6, as well as the sealing of the conical hole in the lower frame unit 13 by the conical frame 16 of the piston rod 15.

A central control unit controls the extension of the piston rods that are assigned to the lifting units by operating the lifting units accordingly. This central control unit is connected with a control terminal of the motor vehicle test stand. After a starting command has been entered, the central control unit processes a predefined test program, e.g. for ESP testing, in the course of which the vehicle is repeatedly tipped about its longitudinal and transverse axes and the response of the vehicle to this tipping is analyzed.

Each of these tipping processes is characterized in that two adjacent piston rods are extended by the respectively associated lifting unit while the other two remain in their retracted position.

These four lifting units, which serve to extend the corresponding piston rods and thus to carry out the tipping processes, are provided exclusively to execute these tipping processes. The raising of the vehicle located on the tipping device is carried out by the separate lifting unit 11, which, as illustrated in FIG. 1, is arranged in the region of the guides 12.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. Test stand for motor vehicles, having a tipping device comprising:

a lower frame unit;

an upper frame unit configured to tip relative to the lower frame unit; and four lifting units, each of the lifting units including a respective piston rod oriented substantially orthogonal to the upper frame unit when in a non-extended position, and extendible in a direction at least substantially orthogonal to the lower frame unit and connected to the upper frame, and operable to tip the upper frame.

2. Test stand having a tipping device as claimed in claim 1, wherein the lower frame unit and the upper frame unit are interconnected exclusively via the lifting units.

3. Test stand having a tipping device as claimed in claim 1, wherein the four lifting units are configured exclusively for tipping the upper frame unit.

4. Test stand having a tipping device as claimed in claim 1, wherein the lifting units are controlled with a control terminal via a central control unit.

5. Test stand having a tipping device as claimed in claim 1, wherein the test stand is an Electronic Stability Program test stand.

6. A test stand according to claim 1, wherein each of the lifting units being operable to tip the upper frame independently of two of the other three lifting units.

7. A test stand according to claim 1, wherein each of the lifting units is extendable independently of the other lifting units.

8. A test stand according to claim 1, wherein the four lifting units are respectively disposed in corner zones of the frame units.

9. Test stand having a tipping device as claimed in claim 8, wherein the lower unit has conical holes each respectively in one of the corner zones and each widening upwards, and wherein the piston rods extend respectively through each of the conical holes.

10. Test stand having a tipping device as claimed in claim 9, wherein each of the piston rods is connected, in a respective upper end region of each piston rod, with the upper frame unit via respective spherical bearings.

11. Test stand having a tipping device as claimed in claim 9, wherein the upper frame unit is tipped by positioning two adjacent ones of the piston rods in respective retracted positions while extending two other ones of the piston rods from respective retracted positions.

12. Test stand having a tipping device as claimed in claim 9, wherein the piston rods comprise respective conical frames along outer circumferences of the piston rods, and wherein each of the conical frames, in a retracted position, forms a centered positive connection in lateral directions between the piston rod and the lower frame unit, thereby forming a locating bearing between the lower frame unit and the upper frame unit.

13. Test stand having a tipping device as claimed in claim 12, wherein each of the piston rods deflects laterally when the piston rod is extended from a retracted position.

14. Test stand for motor vehicles, having a tipping device comprising:

a lower frame unit;

an upper frame unit configured to tip relative to the lower frame unit; and lifting means attached to the lower frame unit and connectable to the upper frame that tip the upper frame, the lifting means including piston rods oriented substantially orthogonal to the upper frame unit when in a non-extended position, and extendible in a direction at least substantially orthogonal to the lower frame unit and connected to the upper frame, and providing the sole source of tipping.

15. A test stand according to claim 14, wherein the lifting means are disposed in corner zones of the frame units.

16. A test stand according to claim 14, wherein the piston rods are independently operable.

17. A test stand according to claim 14, wherein the lifting means are operable to tilt a vehicle in at least one of a longitudinal and transverse direction relative to an axis of the vehicle.

18. Test stand for a motor vehicle, having a tipping device comprising:

a lower frame unit;

an upper frame unit configured to secure the motor vehicle for testing and to tip relative to the lower frame unit during the testing; and lifting units oriented substantially orthogonal to the upper frame unit when in a non-extended position, and extendable in an axial direction.

19. A test stand according to claim 18, wherein the each of the lifting units is extendable independently of the other lifting units.

20. A test stand according to claim 18, wherein the lifting units are operable to tilt a vehicle in at least one of a longitudinal and transverse direction relative to an axis of the vehicle.

21. A test stand according to claim 18, wherein the lifting units comprise four piston rods disposed in corner zones of the frame units.

22. Test stand for motor vehicles, having a tipping device comprising:

a lower frame unit;

an upper frame unit configured to tip relative to the lower frame unit;

four lifting units disposed in corner zones of the frame units;

four piston rods each respectively associated with the four lifting units, wherein the lower unit has conical holes each respectively in one of the corner zones and each widening upwards, wherein the piston rods extend respectively through each of the conical holes, the piston rods comprising respective conical frames along outer circumferences of the piston rods, wherein each of the conical frames, in a retracted position, forms a centered positive connection in lateral directions between the piston rod and the lower frame unit, thereby forming a locating bearing between the lower frame unit and the upper frame unit, and wherein each of the piston rods deflects laterally when the piston rod is extended from a retracted position.

* * * * *